United States Patent
Reuter et al.

(10) Patent No.: US 9,133,586 B2
(45) Date of Patent: Sep. 15, 2015

(54) CONSTRUCTION MACHINE, MORE PARTICULARLY ROAD MILLING MACHINE, AND METHOD FOR COMPENSATING FOR GROUND UNEVENNESS BY MEANS OF SAID CONSTRUCTION MACHINE

(71) Applicant: BOMAG GmbH, Boppard (DE)

(72) Inventors: Marco Reuter, Emmelshausen (DE); Andre Hoffmann, Gondershausen (DE); Andreas Nacke, Dessighofen (DE); Bernd Lubischer, Boppard (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/307,958

(22) Filed: Jun. 18, 2014

(65) Prior Publication Data

US 2014/0379227 A1    Dec. 25, 2014

(30) Foreign Application Priority Data

Jun. 19, 2013   (DE) .......................... 10 2013 010 298

(51) Int. Cl.
| | | |
|---|---|---|
| *E01C 23/088* | (2006.01) | |
| *E01C 23/08* | (2006.01) | |
| *E01C 23/12* | (2006.01) | |
| *B60G 3/01* | (2006.01) | |
| *B60G 17/0165* | (2006.01) | |
| *B60G 17/04* | (2006.01) | |
| *B60G 17/052* | (2006.01) | |

(52) U.S. Cl.
CPC . *E01C 23/08* (2013.01); *B60G 3/01* (2013.01); *B60G 17/0165* (2013.01); *B60G 17/04* (2013.01); *B60G 17/0525* (2013.01); *E01C 23/12* (2013.01); *B60G 2300/09* (2013.01); *B60G 2300/37* (2013.01); *E01C 23/088* (2013.01)

(58) Field of Classification Search
USPC .............. 701/50; 299/1.5, 36.1, 39.6; 404/83, 404/84.05, 84.8
See application file for complete search history.

(56) References Cited

U.S. PATENT DOCUMENTS

| | | | |
|---|---|---|---|
| 8,246,270 B2 * | 8/2012 | Berning et al. | 404/84.1 |
| 8,424,972 B2 * | 4/2013 | Berning et al. | 299/1.5 |
| 8,794,867 B2 * | 8/2014 | Snoeck et al. | 404/84.05 |
| 2002/0047301 A1 | 4/2002 | Davis | |

FOREIGN PATENT DOCUMENTS

| | | |
|---|---|---|
| EP | 0 264 944 B1 | 1/1993 |
| EP | 0 940 274 B1 | 5/2006 |

OTHER PUBLICATIONS

German Patent Office, Search Report for Application No. 10 2013 010 298.7, dated Feb. 28, 2014 (5 pages).

* cited by examiner

*Primary Examiner* — Thomas Tarcza
*Assistant Examiner* — Tyler J Lee
(74) *Attorney, Agent, or Firm* — Wood, Herron & Evans, LLP (57) ABSTRACT

The present invention relates to a construction machine, in particular a ground milling machine, comprising transportation means connected to the machine frame via lifting columns. The lift adjustment of the lifting columns occurs as a function of the determined pressure values respectively applied to at least one actuator of a pair of front and/or rear transportation means. The present invention further relates to a method of compensating for ground unevenness for such a construction machine.

14 Claims, 6 Drawing Sheets

CONSTRUCTION MACHINE, MORE PARTICULARLY ROAD MILLING MACHINE, AND METHOD FOR COMPENSATING FOR GROUND UNEVENNESS BY MEANS OF SAID CONSTRUCTION MACHINE

CROSS-REFERENCE TO RELATED APPLICATIONS

The present application claims priority under 35 U.S.C. §119 of German Patent Application No. 10 2013 010 298.7, filed Jun. 19, 2013, the disclosure of which is hereby incorporated herein by reference in its entirety.

FIELD OF THE INVENTION

The present invention relates to a construction machine, more particularly, a road milling machine, and to a method for compensating for ground unevenness for a construction machine, more particularly, for a road milling machine.

BACKGROUND OF THE INVENTION

Generic construction machines, more particularly, road milling machines, are disclosed, for example, in DE 10 2006 062 129 A1, DE 10 2005 044 211 A1, DE 103 37 600 A1, and WO 03/064770 A1. Such road milling machines are used for milling the ground, for example, for milling road surfaces and/or for carrying out stabilizing and/or recycling measures for the ground and comprise for this purpose a milling device having a milling drum mounted with its axis of rotation extending horizontally and transversely to the direction of advance and adapted to mill the ground during rotational working operation by means of appropriate working tools disposed on the cylindrical outer surface of the milling drum. Apart from the milling device, such a road milling machine also comprises a machine frame that forms the essential supporting structure of the construction machine. Furthermore, a pair of front transportation means and a pair of rear transportation means are usually disposed on the machine frame, wherein, in the present case, the term "transportation means" is understood to mean wheels or crawler chains. However, a single pair of the transportation means may fundamentally also be substituted by a single transportation means in known manner.

For the purpose of accommodating various vertical positions of the machine frame in relation to the ground, at least one pair of the front and/or rear transportation means is connected to the machine frame by means of lifting columns each of which comprises an actuator. In this regard, the lifting columns are constructed in such a way that they can alter the distance between the machine frame and the transportation means, more particularly, at least partly in a vertical direction, for the purpose of effecting lift adjustment of the machine frame in a vertical direction relative to the ground. The actuators are, in particular, linear actuators and are arranged, in particular, in such a way that linear adjustment in a vertical direction is possible. Furthermore, generic construction machines comprise a control device designed to control the lift adjustment of the lifting columns by means of the actuators. In this regard, the main function of the control device lies, more particularly, in facilitating the coordinated adjustment of the actuators toward each other for the purpose of facilitating the regulation, on the one hand, of the height adjustment of the construction machine itself and, on the other hand, for adjusting the position of the machine frame in relation to the ground.

A particularly challenging problem to be solved, especially in connection with generic road milling machines, relates, on the one hand, to the realization of uniform operating results, for example, as regards the milling depth, and, on the other hand, to the achievement of adequate tipping resistance of the road miller for the purpose of guaranteeing safe working conditions. This is particularly problematic in the case of ground unevenness and/or when traveling over obstructions, for example, when traveling over a milled edge. Due to the relatively high center of gravity of such construction machines, they feature a relatively high tendency to tip over as soon as the machine assumes a slightly tipped position.

SUMMARY OF THE INVENTION

It is thus an object of the present invention to demonstrate how the tipping resistance of a generic construction machine on uneven ground can be guaranteed as reliably and safely as possible.

According to one aspect of the present invention, provision is made for a pressure measuring device to be allocated to at least one actuator of a pair of front or rear transportation means, with such pressure measuring device being designed to ascertain the value of a pressure applied to the at least one actuator. Thus, it is of primary importance that the transportation means under consideration can be regarded in pairs, of which one pair respectively consists of a transportation means disposed on the right-hand side and a transportation means disposed on the left-hand side of the machine. The terms "front" and "rear" relate to the forward direction of the construction machine, signifying that the front transportation means are disposed in the forward direction on the front half of the machine frame and the rear transportation means are disposed on the rear half of the machine frame. The term "actuator" describes generally the device adjusting the degree of lift provided by the lifting columns. More detailed description as regards specific exemplary embodiments of the actuators are made below. The term "pressure measuring device" describes in general a device by means of which the pressure applied to the actuator at any one time can be measured and is in fact measured. In this regard, it is essential for the weight force of the construction machine to be applied to the transportation means and to be deflected, at least in part, into the ground via the lifting columns. The pressure measuring device now makes it possible to measure, and monitor over time, the pressure that is applied to the respective actuator as a result, more particularly, of the respective weight force applied to the construction machine. In this regard, the pressure can basically be measured at any point on the actuator at which the applied pressure is dependent, at least in part, on the weight force distribution of the construction machine on the transportation means.

The height adjustment of the lifting columns is powered by means of an appropriate driving device. Such device consequently supplies the driving energy required for adjustment of the lifting columns. More particularly, such a driving device can consist of, say, one or more servomotors or, for example, of a hydraulic pump. According to one aspect of the present invention, the driving device is constructed in such a manner that it allows for independent activation of the relevant actuators for the purpose of enabling individual adjustment of the actuators of at least one pair of transportation means.

According to one embodiment of the present invention, the control device is designed in such a manner that it controls the set position of the actuators of the pair according to the pressure values obtained by the pressure measuring device. Thus, the control device is designed, on the one hand, in such a manner that the pressure values of the at least one actuator obtained by means of the at least one pressure measuring device and registered continuously or at least at predefined intervals are conveyed to said control device, where they are evaluated. Furthermore, the control device is, at the same time, the device that is directly or indirectly responsible for the control of the actuators. Consequently, the control device controls, for example, the driving device for the purpose of individual propulsion of the actuators of the lifting columns. The driving device encompasses all elements that are responsible for the linear motion of the lifting column. Apart from a motor, for example, an electric motor, or a hydraulic pump, this may also comprise pipe systems and, more particularly, controllable flow control valves and shut-off valves of a hydraulic system and/or switches of an electronic control system.

Of essential importance to the concept of the present invention is the realization that the pressure value applied to the at least one actuator of a pair of front and/or rear transportation means essentially depends on the degree of tilt of the construction machine and thus on the weight force distribution of the construction machine to the actuators of the front and/or rear transportation means. For example, in the event of the construction machine being in a position tipped to the right in relation to a basically horizontal starting position of the machine frame as regarded in the direction of advance, or as regarded in the forward direction, the proportion of weight force applied to the right-hand transportation means will increase and the proportion of weight force applied to the left-hand transportation means will decrease. Dependent on the extent of tip or, more particularly, on the degree of increase or decrease of the weight force of the construction machine as applied to the respective transportation means, the pressure values registered by the pressure measuring device at the at least one actuator of a pair of front or rear transportation means also increase or decrease. To summarize, it may be stated that the present invention is based upon the realization that the pressure values monitored at the above positions represent a gauge for the degree of tip of the construction machine. For the purpose of achieving stable balancing of the construction machine to prevent tilting from occurring even when the ground is uneven, as is the case, for example, when driving over obstructions, more particularly, over milled edges, provision is now made according to the present invention for the control device to be constructed in such a manner that, starting from a normal position of the machine frame in which a setpoint pressure value prevails, it controls the two actuators independently of each other when pressure changes occur during the driving operation and approaches the current pressure value in the direction of the setpoint pressure value by means of a reverse lift adjustment. In this regard, the actual pressure value represents the pressure value currently registered by the pressure measuring device, and the pressure setpoint value consequently represents the target pressure value approached by the control device in order, more particularly, to adjust the actual pressure value by way of lift adjustment of the actuators.

The normal position of the machine frame defines a stable starting position of the machine frame, more particularly, a horizontal arrangement of the machine frame, in particular such that the center of gravity of the construction machine lies as centrally as possible in the horizontal plane, especially at least in relation to the two longitudinal sides of the construction machine. In the normal position of the machine frame, a setpoint pressure is applied to the at least one actuator. In this regard, the normal position can be chosen such that the weight force applied to the two front transportation means and/or to the two rear transportation means of a pair is distributed evenly, but this is not mandatory. Consequently, the pressure setpoint value thus constitutes the reference value for the control device, in the direction to which reference value the control device controls the adjustment of the actuators for the purpose of adjusting the lift of the lifting columns when pressure changes occur on the at least one actuator. In the event of pressure changes occurring, i.e., in the form of deviations from the pressure setpoint value, and being registered by the pressure measuring device, the control device controls the settings of the two actuators of a pair of the front and/or rear transportation means in a mutually reverse fashion. This means that, upon activation of the actuator of the lifting column of the one pair on the right-hand side, the control device will simultaneously and ideally to approximately the same extent retract the lifting column or the actuator on the left-hand side of said pair and vice versa. Consequently, the adjustment of the lifting columns of a pair is carried out conversely to each other. It is essential in this respect that the control device activates the two actuators of a pair independently of, and isolated from, each other for the purpose of achieving, in this case, an electronic pendular function of said pair. In this regard, the control device controls the reverse lift adjustment of the actuators such that it approaches the actual pressure value in the direction of the pressure setpoint value and, particularly preferably, adjusts it to the pressure setpoint value when pressure changes occur. Consequently, the control device continues its reverse lift adjustment of the actuators such that the effects of the change in the lift adjustment on the actual pressure value result in the actual pressure value moving in the direction of the pressure setpoint value. This consequently indicates, in particular, the direction of the adjusting movement. In this way, due to the fact that the pressure value on the at least one actuator is dependent on the degree of tilt of the construction machine, there is obtained, according to one aspect of the present invention, efficient and reliable leveling of the tipping motion of the construction machine, which has a stabilizing effect on the construction machine. This makes it possible to dispense with hydraulic coupling, as the resulting pendular function is effected via the control device by way of individual and independent activation of the two actuators particularly by electronic means.

It is basically possible with regard to each pair of transportation means that the pressure applied to the actuator is registered only on one transportation means or, more particularly, only on the actuator of said one transportation means, and is implemented by the control device for the purpose of controlling the actuators. It is, however, ideal for the control device to register and monitor the pressures and, more particularly, also the pressure profiles during the traveling operation of the construction machine to both sides of the pair of transportation means and consequently individually to the two actuators of a pair of transportation means. It is further preferable, particularly in the case of ground milling machines, for each of the transportation means of the overall chassis to be separately connected to the machine frame by means of a lifting column having an actuator, and that the control device controls each of the actuators separately. Consequently, according to one embodiment, the control device is capable of controlling at least three and, more particularly, four, lifting columns individually and independently of each other for effecting lift adjustments. In this regard, the leveling function by way of converse retraction and extension of the lifting columns as described above is, however, preferably limited to the pair of front wheels and/or the pair of rear wheels. The converse adjustment consequently takes place individually for each pair. It is basically possible, for example, for height adjustment of the construction machine, for example, for leveling purposes, for use to be made of a different type of control of the actuators of the lifting columns, for example, adjustment not in different directions but in the same direction. For the purpose of pendular function, however, provision is made, in particular, for converse adjustment according to the present invention.

An essential functional feature of the actuators is the fact that they enable lift adjustments of the lifting columns to be carried out, particularly in the vertical direction. Particularly, suitable for this purpose are screw-driven elevators and, more particularly, hydraulic cylinders. In the latter case, the construction machine appropriately comprises a hydraulic supply system preferably comprising a hydraulic pump, by means of which the propulsion energy required for the lift adjustment is applied, in which case it is basically also possible to provide multiple hydraulic pumps, for example, optionally individually allocated to a respective actuator or a pair of actuators. Ideally, for each lifting column or, more particularly, for each hydraulic cylinder of one pair or, more particularly, of both pairs of front and/or rear transportation means respectively, at least one valve is present that is independently controllable by means of the control device for the hydraulic inlet and outlet. The lift adjustment control of the lifting columns consequently takes place by opening and closing of appropriate hydraulic valves by means of the control device. According to one embodiment of the present invention, provision is made in this embodiment for each hydraulic cylinder to be associated, in particular, with a pressure measuring device for the purpose of registering the hydraulic pressure applied to the hydraulic cylinder. In the present embodiment, the pressure profile in the hydraulic circuit is consequently utilized as indication of the degree of tilt of the construction machine. In this regard, the hydraulic pressure can be registered by means of the pressure measuring device directly in the hydraulic cylinder or alternatively in a line section positioned forward of the respective valve forward of the hydraulic cylinder, as regarded from the direction of the hydraulic cylinder.

Basically, the hydraulic cylinders used can be working cylinders acting in one direction only, in which case the pressure is measured on the active side of the working cylinder, that is to say, the side on which the hydraulic fluid is present. However, to enable a linear movement of the hydraulic cylinders in both directions as far as possible at a highly precise and reliable level, the hydraulic cylinders used as actuators are preferably working cylinders that act in both directions. Such hydraulic cylinders are characterized by the fact that they can be subjected to the force of hydraulic fluid on both opposing surfaces of the hydraulic piston, in which case a specific distinction is made between a piston side and a rod side with reference to the cylinder chambers. In this respect, the rod side is the side on which the piston rod of the cylindrical piston is present within the hydraulic cylinder. At this point, an annular chamber is present in the internal space of the hydraulic cylinder for the purpose of receiving the hydraulic fluid. The piston side defines the side that faces away from the rod side. In this case, the hydraulic chamber is designed in the form of a cylindrical chamber. In this regard, the pressure measuring device is designed in such a way, according to one aspect of the present invention, that it measures the pressure value either on the piston side or on the rod side. It is furthermore ideal if the pressure measuring device is designed in such a way that it measures pressure values on the piston side as well as on the rod side.

As described above, it is basically sufficient, within the scope of the present invention, when a pressure value is monitored only on one side of the respective pair of transportation means in the appropriate manner, and is used for the control of the leveling function of the pair of transportation means by means of a setpoint pressure value. Such pressure values may be absolute pressure values, or they may alternatively be relative pressure values. However, pressure changes may occur during operation of the machine that are not attributable to tipping of the construction machine. One such change may, for example, be weight loss due to the consumption of fuel and/or water, caused by the milling drum engaging with the ground at the commencement of, and during, operation, etc. It is further preferred, particularly for these reasons, that the control device is designed in such a way that it measures a relative pressure value between the two sides of the respective pair of transportation means and uses this as a basis for the control of the actuators of the pair of transportation means. In this preferred development, the control device is consequently constructed in such a way that, with the machine frame being in the normal position in relation to a pair of transportation means, it calculates a setpoint pressure value for each actuator and from this a setpoint pressure value quotient and controls the two actuators independently of each other in the case of pressure changes occurring during operation, and triggers these actuators from an actual pressure value quotient in the direction of the setpoint pressure value quotient by means of a converse lift adjustment of the actuators. An essential advantage of this embodiment consequently lies in the fact that the control device conversely adjusts the lift adjustment of the actuators of the pair of front and/or rear transportation means by means of its pressure value ratio. Consequently, as an example, pressure changes relating to the two actuators, for example, due to fuel consumption, are equalized, at least approximately.

The above-described pressure measuring devices are preferably part of a comprehensive sensor system of the construction machine, registering advanced information regarding position and/or status and conveying such information to the control device. This particularly applies to the presence of a filling level sensor for the fuel tank, permitting inference on the weight change of the construction machine depending on the amount of fuel currently available. In that case, corresponding changes in the weight force distribution can also be taken into consideration by the control device. Additionally or alternatively, a filling level sensor for the water tank is provided, likewise making it possible to determine the amount of water currently present therein. Furthermore, the sensor system can, additionally or alternatively, finally also comprise, for example, a tilt sensor, for example, for measuring the degree of tilt of the machine frame along the longitudinal axis or the transverse axis of the construction machine and/or for assessing and monitoring the position of the milling drum. Of course, the sensor system can be enhanced by means of additional sensors, for example, for ascertaining the direction of travel, the speed of travel, the mode of operation (driving or working), etc. This particularly also applies, for example, to a sensor device when utilizing a working platform or driver's cabin movable relatively to the machine frame, by means of which sensor device the position of the working platform or of the driver's cabin can be determined and monitored to hereby offset any shifts in the center of gravity and thus, if necessary, any changes in weight force in the individual lifting columns. It is essential for the control device to be appropriately connected to the sensor system for the purpose of accessing the sensor data thus determined.

Consequently, the primary function of the present system comprising the design of the construction machine having a control device relates to the achievement of tipping stability for the construction machine, particularly when the construction machine is in the form of a ground milling machine, more particularly, a road milling machine, and/or to ensure contact with the ground for all transportation means present. Various levels of vertical positioning of the machine frame, particularly in the case of ground milling machines, are however often required, for example, for setting the milling depth. In this respect, the determination of the milling depth usually takes place by means of a leveling system furthermore designed in such manner that it ensures adherence to the required milling depth throughout the milling operation. To this end, the ground milling machine according to one embodiment of the present invention preferably comprises a device for the determination of the vertical level of the construction machine in the normal position. In other words, such device detects the distance of a reference point, for example, a point on the machine frame, in a direction perpendicular to the ground and/or it detects the depth of penetration of the milling drum into the ground. The vertical position of one or more lifting columns determined by means of this device can basically also be observed by the control device of the present invention for the surveillance and control of the tipping stability.

In this respect it is further possible, for example, to design the control device in such a way that triggering of a converse adjustment of the actuators of a pair of transportation means only takes place when determined threshold values have been exceeded or have not been reached, for example, with reference to the actual pressure value. In this way, a certain tolerance range is created, within which a counter-regulation by means of the control device does not yet take place. Additionally or alternatively, maximum adjustment levels not to be exceeded by the linear movements triggered by the control device can be set for the actuators. In this way, actuator components can, for example, be prevented from hitting against each other and thus possibly being damaged, for example. Of course, the control device can additionally be designed in such a way that it comprises an input device for determining and entering the threshold values and/or maximum values. This makes it possible to adapt the settings to the individual conditions. This may be of relevance, for example, when the construction machine is to be used in a sloping starting position, as may be the case when working on sloping terrain, etc.

A particular challenge for the driver particularly of a ground milling machine presents itself on commencement of the milling operation when the milling drum enters the ground for the purpose of milling it to the desired depth. The control device according to one embodiment of the present invention is preferably designed so as to control an automatic milling starter. Such an automatic milling starter is characterized by the fact that a lowering of the ground milling machine with the milling drum in operation is automatically coordinated by the control device up to the point at which the desired milling depth has been reached. This can, in particular, involve smooth lowering of the two lifting columns of a pair of transportation means at a predefined lowering rate, also, in particular, with respect to the particular milling drum in use and/or to the ground material and/or to the selected speed of rotation of the milling drum. This thus ensures, for example, that soil material is not milled deeper than to the desired milling depth and/or that the milling drum is not damaged by lowering it too quickly into the ground.

Finally, another aspect of the present invention relates to a method of compensating for ground unevenness for a construction machine, in particular for a ground milling machine, traveling over such ground unevenness, particularly for a construction machine as defined above. With reference to the design and arrangement of the device components described below for implementation of the method according to one embodiment of the present invention, reference is also made, in particular, to the above description.

The method according to one embodiment of the present invention firstly consists in registering the pressure value applied to at least one actuator of at least one lifting column of at least one transportation means, by means of a pressure measuring device. In this context, reference is substantially made to the above description. The registered pressure value taken is subsequently conveyed to the control device. The pressure measuring device consists, in particular, of at least one pressure sensor adapted to provide precise monitoring of pressure. The registration and dispatch of pressure values to the control device is carried out continuously or at least at regular intervals, in order to provide the control device with a constant supply of current pressure values, particularly when the ground milling machine is in operation mode.

The method according to one embodiment of the present invention also makes provision for setting a pressure setpoint value for at least one actuator of a lifting column of at least one transportation means, in which the machine frame is set in the normal position. The normal position is that position of the machine frame as has been defined as the starting position thereof. The normal position can be, for example, a position in which the machine frame is at a level parallel to the horizontal ground level. Of course, the present invention also relates to other types of starting or normal positions. The pressure setpoint value represents the pressure value by means of which the control device effects leveling of ground unevenness according to the further method steps for the purpose of maintaining the ground milling machine in a tip-resistant and, more particularly, normal position, even when moving over uneven ground, for example, a milled edge. The pressure setpoint value is therefore a reference value to which the method steps below are oriented. The setpoint pressure value may be set manually or, if desired, automatically.

To implement the method according to one embodiment of the present invention, provision is also made for the pressure value applied to the actuator to be monitored while the construction machine is in motion. In other words, the pressure measuring device will continue to convey current pressure values to the control device while the construction machine continues to move. This includes transfer at predefined, preferably regular, intervals. According to one embodiment of the present invention, such actual pressure values, that are equivalent to the respective pressure value currently determined by the pressure measuring device, are compared with the setpoint pressure value by the control device.

During the final and crucial operational step of the method according to one embodiment of the present invention, any deviation between the actual pressure value and the setpoint pressure value that occurs and is registered by the control device results in a converse adjustment of the lifting columns of the front transportation means and/or the rear transportation means, respectively in pairs, in the opposite direction, that is to say, in the direction of the setpoint pressure value by way of separate activation of the actuators by means of the control device. A converse shift of the lifting columns in the opposite direction toward the setpoint pressure value thus means that the linear movement of the lifting columns triggered by the control device is controlled in such a way that the actual pressure value approaches the setpoint pressure value. This means, for example, that when the ground milling machine shows an increased actual pressure value on the front right-hand lifting column, the control device triggers an adjustment movement of the front right-hand and front left-hand lifting columns in the opposite direction in such a way that the actual pressure value approaches the setpoint pressure value representative of the normal position. Consequently, if one actuator is extended, the actuator of the other lifting column of the respective pair of transportation means is retracted and vice versa. Depending on the arrangement and design of the pressure measuring device, this can result, for example, in extension or retraction of the front right-hand lifting column (and a corresponding movement in the opposite direction of the front left-hand lifting column, and, independently thereof, appropriate movement of the pair of rear transportation means and lifting columns).

The method according to one embodiment of the present invention makes provision for a setpoint pressure value to be defined for at least one actuator of a pair of transportation means (in particular, for a pair of actuators for which the implementation of the above method is intended). However, in order to make it possible to compensate at a particularly high level for fluctuations in, and/or displacement of, weight or for fluctuations in, and/or displacement of, weight force that may occur, for example, during operation of the construction machine due, for example, to the consumption of fuel or water, or for similar reasons occurring during operation, it is preferable, according to one aspect of the present invention, to determine the setpoint pressure value in the form of a setpoint pressure value quotient from two setpoint pressure values of two actuators of a pair of transportation means as reference factor for the linear movements triggered by the control device of the actuators and to define this as a reference value. In this embodiment of the present invention, the pressure value ratio relating to the actuators of a pair of front and/or rear transportation means is therefore set as a reference value for the control device. Accordingly, such a development of the method according to one aspect of the present invention involves comparison and adjustment with respect to the setpoint pressure value quotient. An ensuing advantage is that changes in pressure values equally affecting both actuators of a pair of front and/or rear transportation means have no effect on the adjusting movements carried out by the control device. In other words, filtering of changes in pressure values specific to tilting movements is therefore achieved, with the result that such development of the method according to the present invention improves particularly reliably the tipping resistance of the construction machine. It is self-evident that in such a development the pressure measuring device must be designed in such a manner that registration and monitoring of pressure values is possible at both actuators of a pair of transportation means. More particularly, a pressure sensor is provided, for example, for registration of pressure in an actuator in the form of a hydraulic cylinder, for each lifting column of a pair of transportation means.

Additionally or alternatively, it is further preferred, for the reasons described above, that a correction be carried out by the control device for the purpose of carrying out the method according to one embodiment of the present invention in such a way that it results in synchronization of the setpoint pressure value or the setpoint pressure value quotient with at least one signal of at least one of the following sensors: the water level sensor, the fuel level sensor, and the tilt sensor. The tilt sensor, for example, serves to determine the degree of tilt of the machine frame along the longitudinal axis of the construction machine. In this respect, reference is also made, in particular, to previous description concerning the construction machine according to one embodiment of the present invention. Such methods facilitate registration and appropriate compensation of, for example, changes in mass of the entire construction machine, for example, due to fuel consumption. In practical terms this means, for example, that the entire vehicle, becoming lighter due to fuel consumption and/or water consumption, necessarily results in a reduction of the total weight force bearing on the lifting columns of the construction machine. Such changes can at least be indirectly monitored and registered by means of the appropriate sensors. More particularly, the control device would then, for example, also lower the setpoint pressure value(s), in particular taking into account changes in weight force distribution over the entire construction machine. For practical purposes, use may be made, for example, empirically calculated reference values.

For the purpose of carrying out the method according to the present invention, it is advantageous to register the pressure at points of like function when determining the pressure values on both actuators of a pair of transportation means. The pressure values thus registered are then directly comparable with each other in terms of time and quantity.

BRIEF DESCRIPTION OF THE DRAWINGS

The present invention is explained in detail below with reference to the exemplary embodiments shown in the figures. Shown diagrammatically are.

Like components are identified in the drawings by like reference numerals, but not every recurring component is shown separately in the figures.

DETAILED DESCRIPTION OF THE INVENTION

Figure 1:
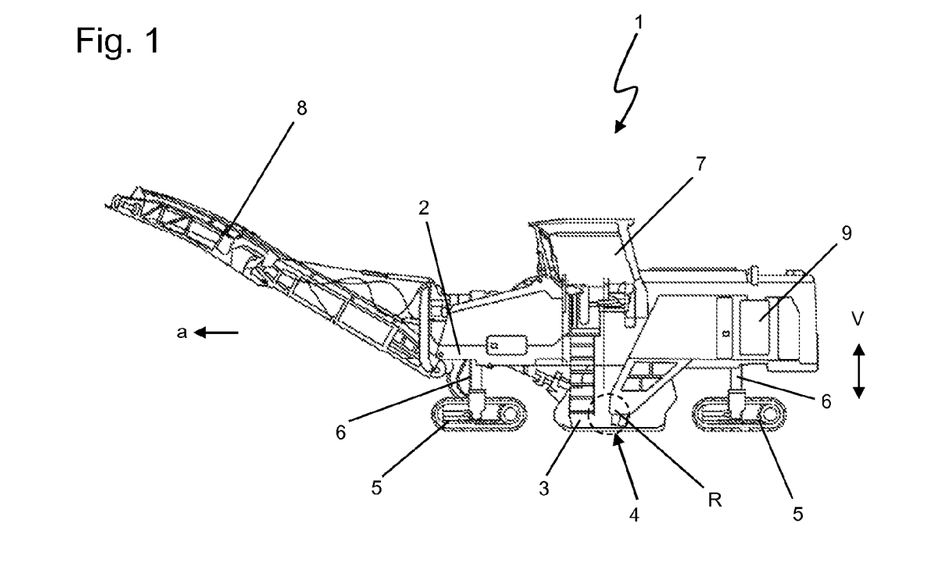
FIG. 1 is a side view of a ground milling machine, more particularly, a road cold milling machine.

FIG. 1 shows a generic construction machine, more particularly, a road cold milling machine 1. Essential elements of the road miller 1 are a machine frame 2, a milling drum 4 (indicated as dashed lines) disposed within a milling drum box 3, a number of transportation means 5, in this case crawler tracks connected to the machine frame 2 by means of lifting columns 6 and supporting the ground milling machine 1, an operator's platform 7, a front conveyor 8, and a driving device 9. In operational mode, the ground milling machine 1 moves in the direction of advance a across the ground to be milled, whilst the milling drum 4, rotating around an axis of rotation R extending horizontally and transversely to the direction of advance, engages into the ground and mills the same by means of milling tools, which are not shown in detail, in a manner known in the prior art.

Figure 2:
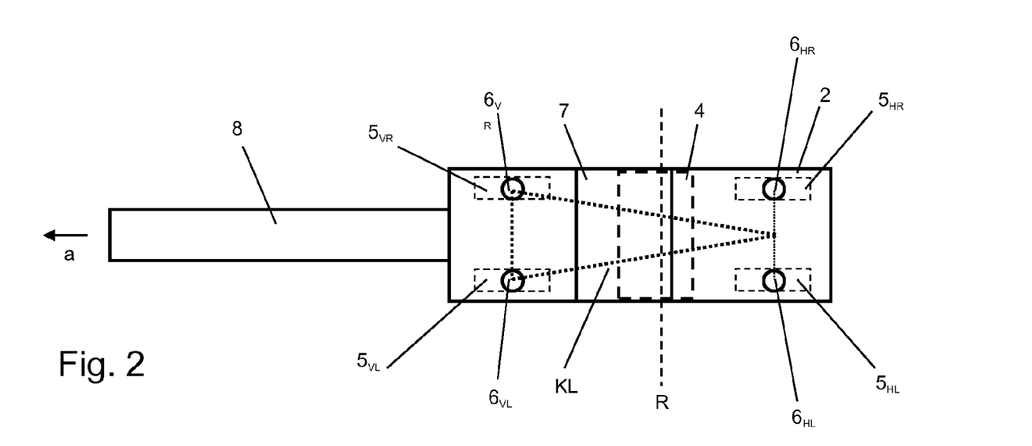
FIG. 2 is a top view of the ground milling machine of FIG. 1.

FIG. 2 illustrates the basic configuration of the ground milling machine 1 by way of a diagrammatic top view. Overall, the ground milling machine 1 thus comprises a pair of front transportation means $5_{VR}$ and $5_{VL}$, respectively connected to the machine frame 2 via one of the lifting columns $6_{VR}$ or $6_{VL}$. Additionally, a pair of rear transportation means $5_{HR}$ and $5_{HL}$ is comprised, connected to the machine frame via the lifting columns $6_{HR}$ and $6_{HL}$. In this case, "H" and "V" identify the placement in the forward direction a of the ground milling machine 1 and signify "rear" and "front", "R" and "L" identify the side of the ground milling machine 1 as seen in the forward direction and signify "right" and "left".

During operational mode of the ground milling machine 1, two fundamental challenges are presented to the machine operator in regard to the positional stability of the ground milling machine 1. On the one hand, milling of the ground to a predefined and controlled milling depth ("leveling") is desired, for example, for the purpose of ensuring sufficient removal of ground material and to make sure, if necessary, that no damage is caused to the deeper layers of the road bed. On the other hand, such ground milling machines tend to tilt comparatively easily due to their high center of gravity, particularly when traveling over obstacles on the ground such as milled edges. In order to increase the tipping resistance of such ground milling machines 1, so-called "pendular oscillation" is applied, this providing counteracting height adjustment of the pair of front transportation means $5_{VR}$ and $5_{VL}$ and of the rear transportation means $5_{HR}$ and $5_{HL}$ in the manner of a pendular axle, consequently and at least in part compensating for ground unevenness relatively to the machine frame 2. To this effect, the lifting columns 6 are height-adjustable in the vertical direction V or adjustable in the vertical direction. For this purpose, each lifting column 6 comprises an actuator 10 in the form of a double-acting hydraulic cylinder, the structure and functionality of which are specified in more detail in FIGS. 4a to 4c. As further specified below, the present system allows for independent activation of each of the lifting columns 6. However, provision may additionally be made, for example, for the lifting columns to be controlled interdependently, for example, in pairs. The realization of a virtual pendular axle is thus also possible, as illustrated, for example, in FIG. 2 for the two rear lifting columns $6_{HL}$ and $6_{HR}$. The tilt lines KL of the three-way oscillation thus obtained that provide the borderline for the machine center of gravity in the horizontal plane to provide stability of the machine can thus be quickly altered, for example, to four-way oscillation, by means of appropriate adaptation of the control device.

Figure 3:
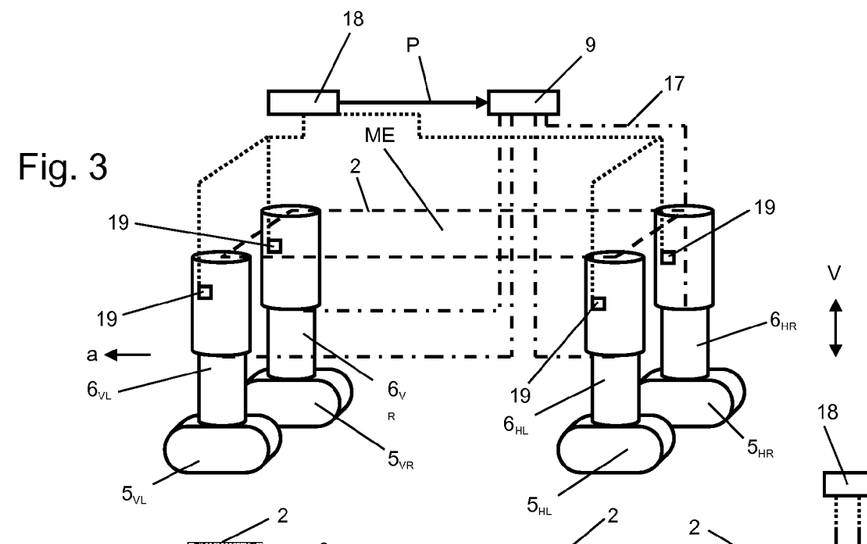
FIG. 3 is a diagrammatic and greatly simplified view of the machine frame together with transportation means and lifting columns of the ground milling machine of FIGS. 1 and 2.

FIG. 3 clarifies the fundamental functionality of the entire chassis of the ground milling machine 1. The machine frame 2 is indicated here by dashed lines at a horizontally positioned machine frame level ME, extending parallel to the horizontal ground in the present example. The driving device 9, for example, an internal combustion engine powering a hydraulic pump of an appropriate hydraulic supply system, is provided for the purpose of driving the height adjustment device. For this purpose, the driving device 9 is fluidly connected by means of appropriate hydraulic lines 17 (shown as dash-dot lines) to each of the actuators 10 in the form of a hydraulic cylinder of the lifting columns 6. The coordination of the linear movement of the actuators 10 and therefore of the lifting columns 6 is carried out by means of a control device 18 connected to pressure measuring devices 19 that record the hydraulic pressure prevalent in the hydraulic system, either on the piston side 14 or the rod side 15. As an example, appropriate signal lines are indicated as dotted lines in FIG. 3. Furthermore, the control device 18 is connected to the driving device 9 via the line P for the purpose of transferring control signals. It is further essential that the control device 18 controls the actuators 10 in pairs, according to one embodiment of the present invention, at least during the driving operation, with the result that, for example, a linear movement of the lifting column $6_{VL}$ also triggers a linear movement of the lifting column $6_{VR}$ but not necessarily a linear movement of the lifting columns $6_{HL}$ or $6_{HR}$. The control device 18 further controls each of the actuators 10 individually and independently of one another. This means that the control device 18 activates both lifting columns 6 or actuators 10 of each pair independently of each other to achieve paired control. This principle on which the control of the linear movement is based is illustrated in detail in particular in the exemplary embodiment illustrated in FIG. 7.

Figures 4A, 4B:
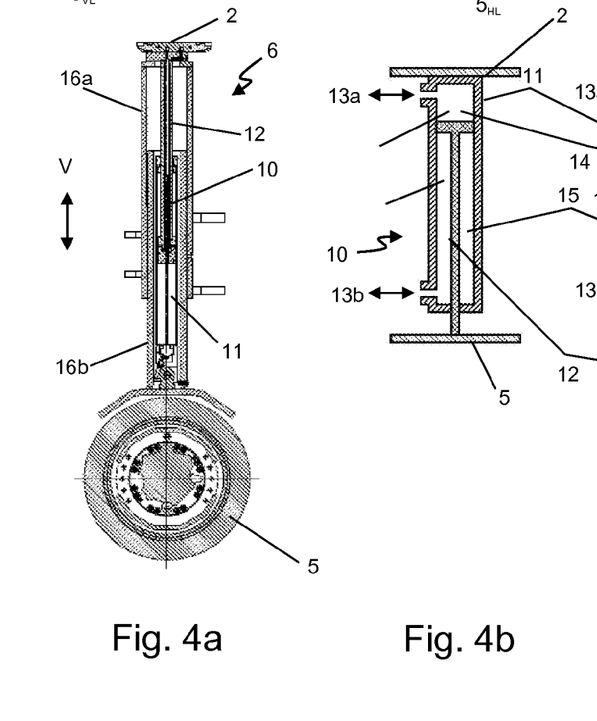
FIGS. 4a-4c are a longitudinal cross-sectional view through a lifting column (FIG. 4a) and illustration of various operating modes (FIGS. 4b and 4c)
Figure 4C:
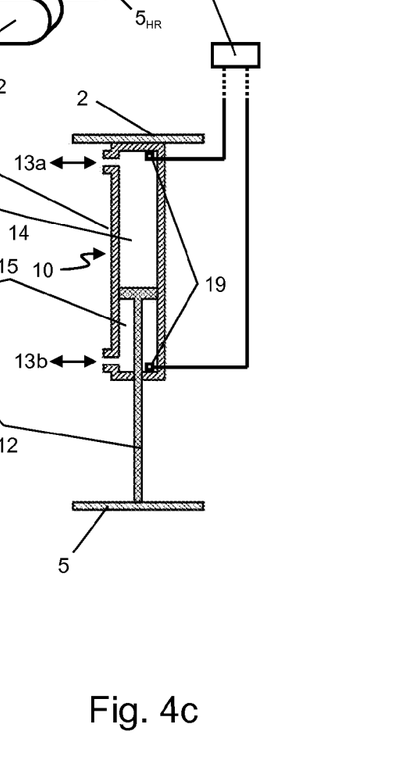

For further clarification, the basic structure of the lifting columns is depicted as an example in FIGS. 4a-4c. In this regard, FIG. 4 is a cross-sectional view through one lifting column 6 in a vertical direction along its longitudinal middle axis. An essential element of each lifting column 6 in this regard is, in particular, an actuator 10, by means of which the adjustment power is applied. In this particular exemplary embodiment, the actuator 10 is a hydraulic cylinder piston unit having a hydraulic cylinder 11 and a piston 12, guided for linear displacement within the hydraulic cylinder 11. The actuator 10 is shielded from the outside against external influences in known manner by means of a pair of sheaths 16a, 16b.

FIGS. 4b and 4c show diagrammatically the functionality of the actuator 10 in more detail, in which FIG. 4b relates to the low position, more specifically the maximum retracted state, and FIG. 4c relates to the high position, more specifically the maximum extended state, of the lifting column 6. In this regard, FIGS. 4b and 4c relate to a reverse arrangement of cylinder 11 and piston 12. The hydraulic cylinder 11 contains two inlet and outlet lines 13a and 13b for the discharge and supply of the hydraulic fluid from/to the internal chamber 14 on the piston side or the internal chamber 15 on the rod side, as indicated by means of the appropriate arrows. In particular, this consequently involves so-called double-acting working cylinders. Furthermore, a pressure sensor as part of the pressure measuring device 19 is respectively disposed in this particular exemplary embodiment (only shown in FIG. 4c) in the piston-side internal chamber 14 as well as in the rod-side internal chamber 15, by means of which pressure sensor the pressure ratio in the hydraulic fluid chamber of the cylinder 11 on the piston side 14 and the rod side 15 can be read and monitored independently of each other. Such pressure sensors are connected to the control device 18 via a suitable signal line.

An essential criterion for the implementation of the pendular function of the pair of front and/or rear transportation means 5 according to one embodiment of the present invention is the basic idea of making use of the changes in weight force that occur whilst driving over an obstruction, which changes particularly present themselves as a reference criterion for the implementation of the linear movement of the actuators 10, for example, in fluctuations in pressure in the hydraulic fluid chamber 14 and/or 15 in the case of the above actuator 10 in the form, for example, of a hydraulic cylinder as described in the above exemplary embodiment. The effect caused by the present invention regarding such fluctuations in pressure becomes particularly evident upon comparison of FIGS. 5 and 6. These respectively relate to the flow of pressure p over time t illustrated by the example of the lifting columns $6_{VL}$ and $6_{VR}$ of the pair of front transportation means $5_{VL}$ and $5_{VR}$ when driving over a ground obstruction protruding vertically upwardly. In this regard, "$6_{VL}$ 15" is equal to the pressure profile on the rod side 15 in the hydraulic fluid chamber of the actuator 10 of the lifting column $6_{VL}$ to the front left; "$6_{VL}$ 14" is equal to the pressure profile on the piston side 14 in the hydraulic fluid chamber of the actuator 10 of the lifting column $6_{VL}$ to the front left; "$6_{VR}$ 15" is equal to the pressure profile on the rod side 15 in the hydraulic fluid chamber of the actuator 10 of the lifting column $6_{VR}$ to the front right; and "$6_{VR}$ 14" is equal to the pressure profile on the piston side 14 in the hydraulic fluid chamber of the actuator 10 of the lifting column $6_{VL}$ to the front right. $p_0$ indicates the pressure setpoint value or, more particularly, the pressure reference value present at the relevant position of the pressure measuring device, with the machine frame 2 being in zero or normal position. At time $t_1$, the front right transportation means $5_{VR}$ of the construction machine 1 hits the obstruction protruding from the ground, during the course of flow in FIG. 5 as well as in FIG. 6; the transportation means $5_{VL}$ continues to travel horizontally along the ground.

Figure 5:
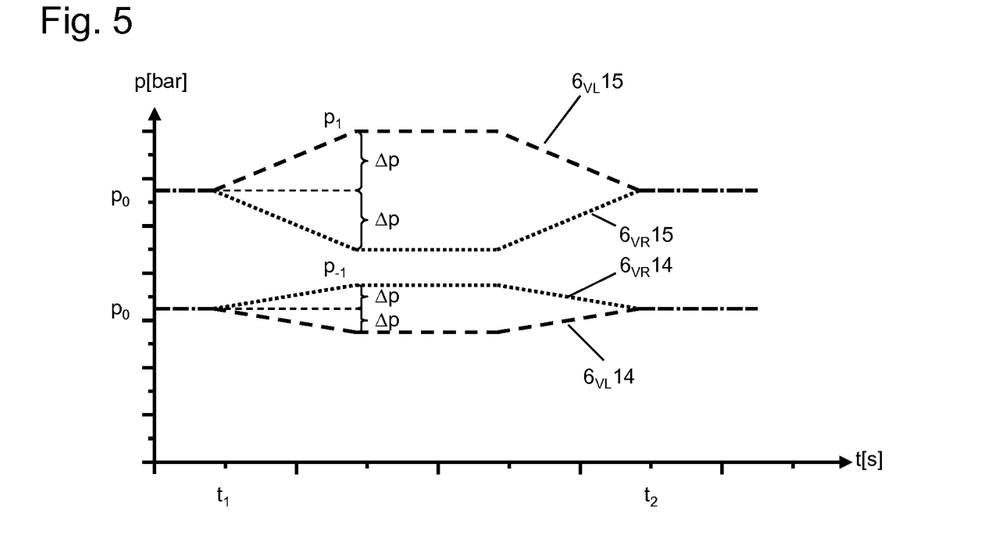
FIG. 5 is a diagram showing the pressure profile when the ground milling machine moves over an obstruction on the ground, without counter-regulation according to one embodiment of the present invention.

In this regard, FIG. 5 firstly illustrates the pressure profile in the hydraulic cylinders 11 without the pendular function according to the present invention involving the control device 18. Based on the basic structure of the ground milling machine 1, FIG. 5 thus illustrates the pressure profile in the hydraulic cylinders 11 of FIGS. 4b and 4c with reference to the lifting columns $6_{VL}$ and $6_{VR}$ when the transportation means $6_{VL}$ drives over an obstruction, resulting in the ground milling machine being pushed vertically upwardly by the transportation means $5_{VR}$. When a pressure reading is taken in the rod-side cylinder chamber 15, the pressure in the hydraulic system will rise from the point in time when the obstruction is traversed to the point in time $t_1$, due to a shift in weight force toward the transportation means $5_{VL}$ occurring on account of the machine frame 2 being raised at the side of the transportation means $5_{VR}$, causing the construction machine to tilt. Starting from the starting pressure $p_0$, the pressure p increases on the rod side 15 of the lifting column $6_{VL}$ by the amount $\Delta p$ to pressure $p_1$ and, conversely, decreases on the opposite side of the pair of front transportation means by the amount $\Delta p$ down to the pressure $p_{-1}$. The ground milling machine 1 is now in a tilted position with a stronger tendency to tilt toward the left. In the event of the ground milling machine continuing its forward travel and passing the obstruction at time $t_2$, the pressure values, beginning at $p_1$ or $p_{-1}$, will return to the starting pressure $p_0$ until the chassis 2 has returned to its initial, horizontal position. The corresponding development of pressure on the piston side 14 proceeds conversely thereto, the pressure difference $\Delta p$ being in this case lower on account of the larger piston surface presented to the cylinder's internal chamber. Thus, the pressure profile shown in FIG. 5 is characteristic of a tilting movement of the ground milling machine 1 when driving single-sidedly over an obstruction without pendular function.

Figure 6:
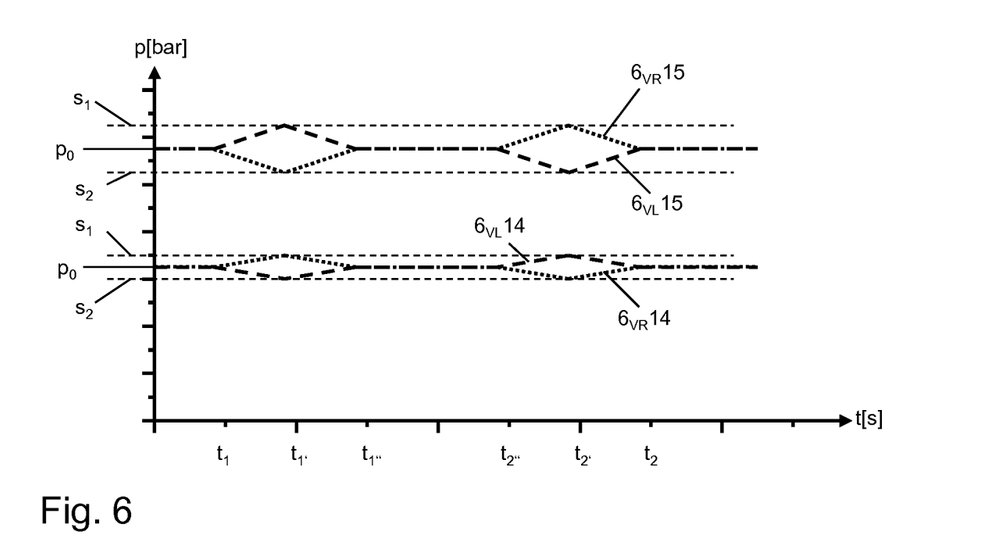
FIG. 6 is a graphic illustration of the pressure profile with counter-regulation according to one embodiment of the present invention.

FIG. 6 now illustrates the pressure-dependent adjustment control of the actuators 10 of the pair of front transportation means $5_{VL}$ und $5_{VR}$, which can additionally or alternatively also be applied to the pair of rear transportation means $5_{HL}$ und $5_{HR}$ and is included within the scope of the present invention. With regard to the position of the obstruction and to the timescale, reference is made to the aforementioned statements relating to FIG. 5. What is essential is that, contrary to the above procedure described with reference to FIG. 5, now a counter-regulation to the occurring pressure changes takes place in such a way that pressure values deviating from the starting pressure $P_0$ are regulated back toward this value. This takes place, in particular, by way of a reverse vertical shift of the actuators of the pair of front transportation means $5_{VL}$ und $5_{VR}$ of the lifting columns $6_{VL}$ and $6_{VR}$ and/or the rear transportation means $5_{HR}$ and $5_{HR}$ of the lifting columns $6_{HL}$ and $6_{HR}$, as shown in detail in FIG. 6. It is important for the method according to the present invention that, on exceeding a pressure change threshold value (more particularly, the pressure change threshold values $s_1$ and $s_2$ for the piston-side chamber 14 or the rod-side chamber 15), a converse linear movement of the actuators 10 of the lifting columns $6_{VR}$ and $6_{VL}$ of the front transportation means $5_{VR}$ and $5_{VL}$ and/or the pair of the rear transportation means takes place by means of appropriate actuation of the control device 18 toward the driving device 9. A linear movement is specified as being converse when the one lifting column, for example, $6_{VL}$, is extended and the other lifting column of the respective pair, for example, $6_{VR}$, is retracted. In this way, the difference in height in the vertical direction, as caused by the obstruction to the pair of front and/or rear transportation means or, more specifically, the shift of the center of gravity caused by tilting of the construction machine is counterbalanced or, more specifically, at least counteracted, according to the pressure. The direct measurement of the distance from the ground or, more particularly, a distance by which to actuate the lifting columns in the vertical direction is not required in this case. Instead, determination of the degree of tilt of the construction machine 1 takes place solely indirectly via registration of the pressure changes on the actuators 10 inherently caused by the shift of the center of gravity.

Based on the particular exemplary embodiment in FIG. 6, this means that, on the one hand, whilst encountering and driving over the obstruction, from time $t_1$ a change in pressure occurs from the starting pressure value $P_0$ and is registered by the relevant pressure measuring devices 19. As soon as the pressure change threshold value $s_1$ and/or $s_2$ is exceeded at time $t_{1'}$, a counter-regulation takes place up to the point when the starting pressure value $P_0$ is reached at time $t_{1''}$. In the reverse order, the same regulating process takes place upon moving off the obstruction at time $t_{2''}$ in which case appropriate pressure change threshold values $S_1$ or $S_2$ are reached at time $t_{2'}$, with the result that a counter-regulation toward the starting pressure value $P_0$ takes place as from this point in time onwards, this value being reached at time $t_2$, at which the movement across the obstruction has been accomplished. Consequently, at time $t_2$ the actuators 10 of the front transportation means $5_{VL}$ and $5_{VR}$ are again in the same position as at time $t_1$ with the same pressure values $P_0$ on the piston side 14 and/or the rod side 15 of the hydraulic cylinder 11 of the actuators 10. Such a regulation procedure also entails that the pressure changes whilst mounting the obstruction and dismounting therefrom occur in the opposite direction to that described with reference to FIG. 5.

Figure 7A:
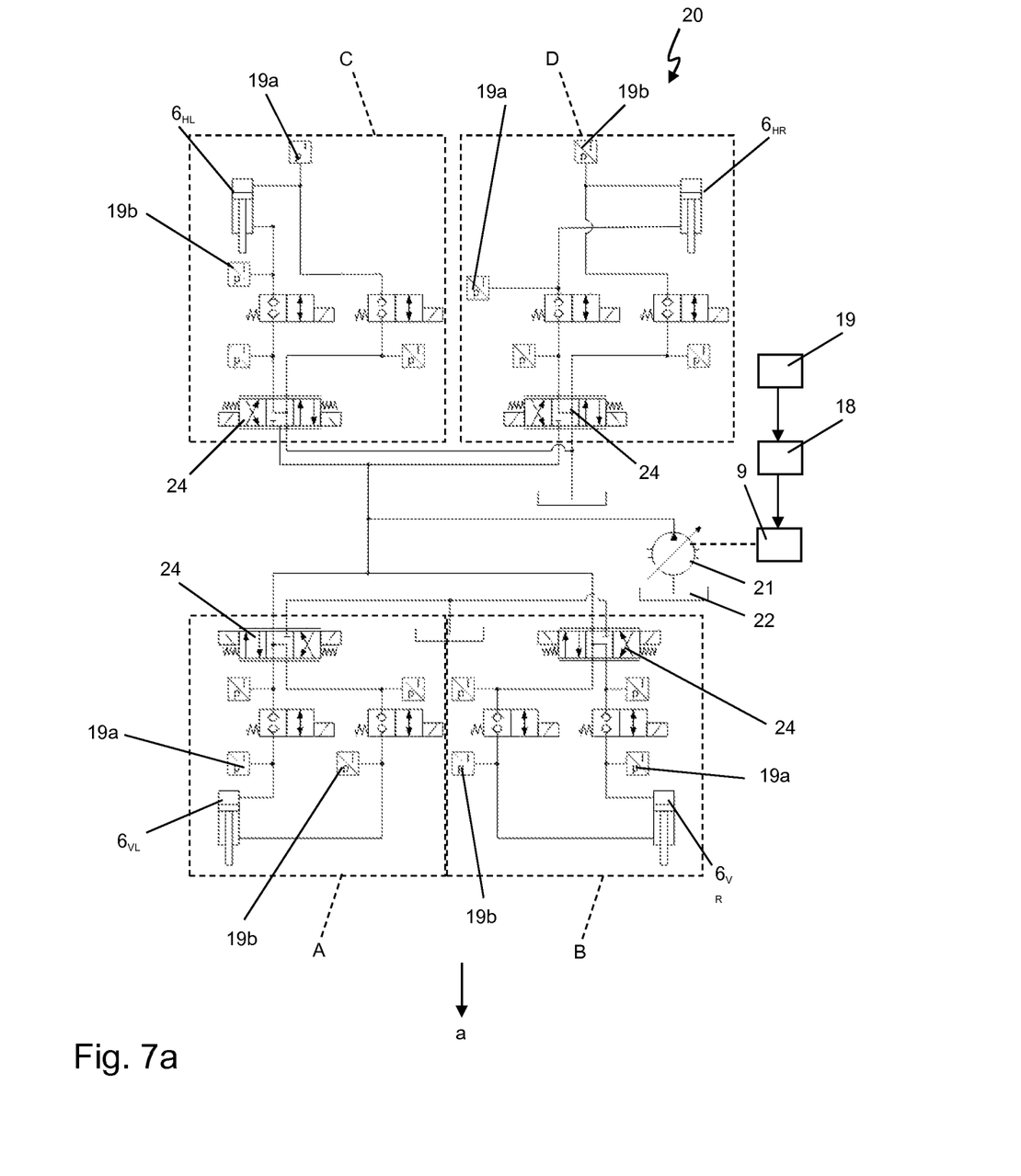
FIGS. 7a and 7b are a hydraulic circuit diagram of a particular embodiment of the present invention (FIG. 7a) and enlarged detail of the area A (FIG. 7b)

FIG. 7 now shows an example of an embodiment of the overall system with pendular function for a ground milling machine 1. In this respect, essential elements of the overall system 20 are the lifting columns $6_{HL}$, $6_{HR}$, $6_{VL}$, and $6_{VR}$ allocated to the respective transportation means $5_{VL}$, $5_{VR}$, $5_{HL}$, and $5_{HR}$ with the appropriate hydraulic interconnection as shown in FIG. 7a to a hydraulic pump 21 powered by the driving device 9 and supplied by the fluid reservoir 22. Control of the multiplicity of installed valves and of the hydraulic pump 21 is carried out by means of the control device 18, which receives the relevant control data from the pressure measuring device 19. In all, the overall system 20 is divided into four substantially identically structured sub-units A, B, C, and D respectively allocated to one of the four lifting columns $6_{HL}$, $6_{HR}$, $6_{VL}$, and $6_{VR}$.

Figure 7B:
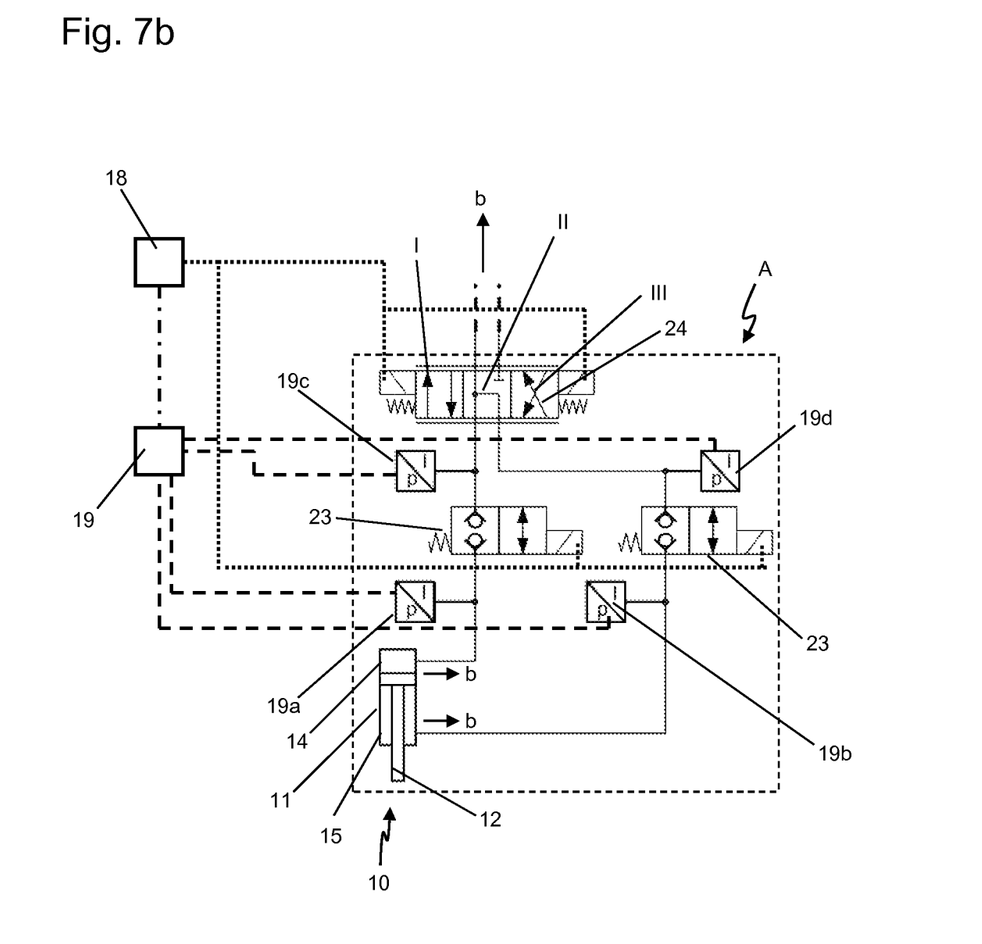

The fundamental structure of the above four basic units A, B, C, and D is explained in more detail with reference to FIG.

7b by means of the lifting column $6_{VL}$ or, more specifically, the sub-unit A as representative of all four lifting columns $6_{HL}$, $6_{HR}$, $6_{VL}$ and $6_{VR}$. In addition to the actual actuator 10 comprising the hydraulic cylinder 11 and the hydraulic piston 12, a stop valve 23 for the hydraulic supply system is positioned in the direction of the arrow b both on the piston side 14 and on the rod side 15, this stop valve being electromagnetically adjustable between a double check position and a flow position and is pressed by spring force into the double check position or the blocked position. In the event of each of the stop valves 23 being in the blocked position, the actuator 10 is held at least substantially in its vertical position. The pressures p in the hydraulic system applied to the piston side 14 and the rod side 15 are determined by means of the pressure sensors 19a (for the piston side 14) and 19b (for the rod side 15) as part of the pressure measuring device 19 and conveyed to the control device 18. The pressure sensors 19a and 19b provide, for example, the pressure values shown in FIG. 6. This is carried out via the dashed signal lines. In response to the changes in pressure, the control device 18 controls the hydraulic system, in particular the pump 21 and the valves 23 and 24. The main function of the stop valves 23 is to maintain a holding function when an adjustment of the actuators 10 is not desired. Also present is a 4/3 directional control valve 24, respectively preceding each stop valve 23 in the direction of the actuator 10. This valve is activated by means of the control device 18 and can be switched between the three positions I (flow position 1), II (floating mid-position) and III (flow position 2). Furthermore, for the purpose of registering the pressure in the hydraulic system between the stop valves 23 and the 4/3 directional control valve, there are provided pressure sensors 19c and 19d that are also part of the pressure measuring device 19 connected to the control device 18. In the event of the stop valves 23 being in their release position and the 4/3 directional control valve being in position I, a retraction of the hydraulic piston 12 into the hydraulic cylinder 11 takes place upon application of pressure, and an extension takes place when it is in position III.

The complete circuit diagram as shown in FIG. 7a illustrates that the two 4/3 directional control valves 24 of a pair of transportation means ($5_{VL}$ plus $5_{VR}$ and $5_{HL}$ plus $5_{HR}$) are reciprocally interconnected in such a way that, when both of the 4/3 directional control valves are positioned in position I, referring, for example, to the front lifting columns $6_{VL}$ and $6_{VR}$, the lifting column $6_{VL}$ will extend and, conversely, the lifting column $6_{VR}$ will retract. Each lifting column 6, more specifically each 4/3 directional control valve 24, is individually controlled by the control device 18, so that no hydraulically, mechanically or electronically forced coupling is used.

Furthermore, in the present exemplary embodiment as displayed in FIG. 7a the two rear lifting columns $6_{HL}$ and $6_{HR}$ are also appropriately integrated in the overall hydraulic system 20 and are also controlled by means of the control device 18, for example, counterdirectionally.

Furthermore, the control device 18 is apart from the above statements basically also adapted to carry out an overall height adjustment of the pair of front lifting columns $6_{VL}$ and $6_{VR}$ and/or of the pair of rear lifting columns $6_{HL}$ and $6_{HR}$ for the purpose, for example, of altering the milling depth or changing the overall position of the machine frame in the vertical direction. It is then possible to adjust the lifting columns 6 jointly and not, in particular, counterdirectionally.

Figure 8:
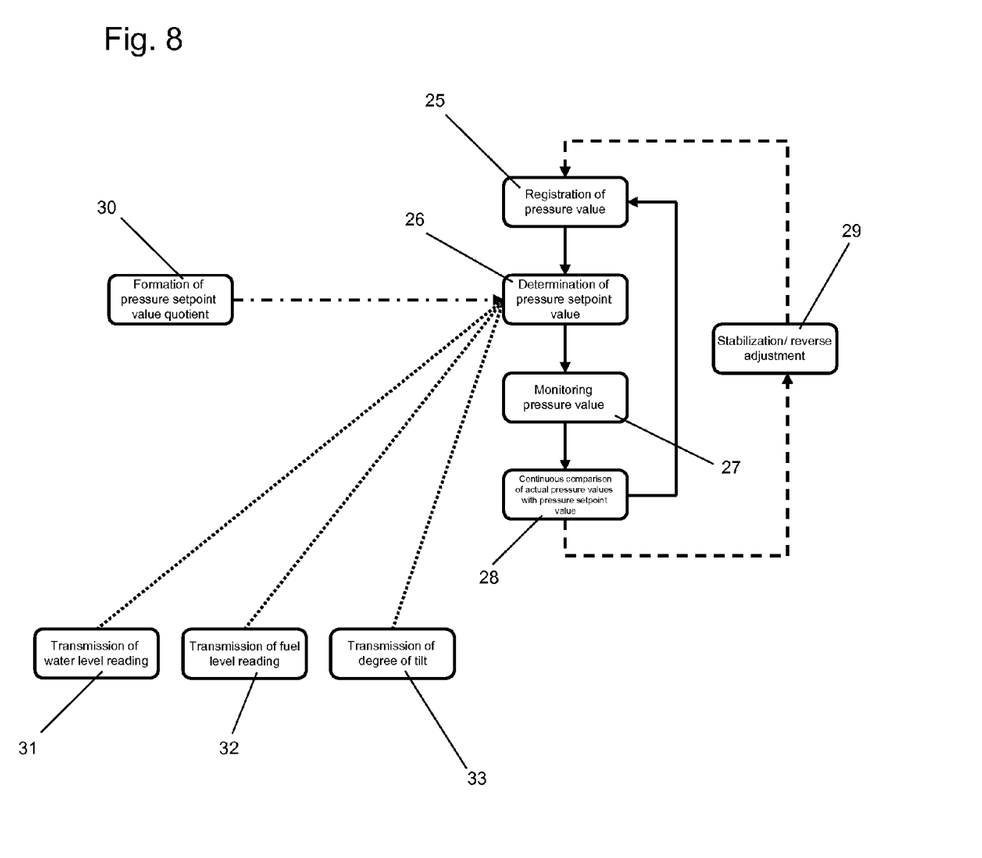
FIG. 8 is a flow chart illustrating the method according to one embodiment of the present invention.

FIG. 8 demonstrates the main steps for carrying out the method according to the present invention. In this method, the registration of a pressure value $P_0$ applied to at least one actuator 10 of a lifting column 6 of at least one transportation means 5 initially takes place during step 25 by means of the pressure measuring device 19, more particularly, a pressure sensor 19a or 19b, following which said pressure value is conveyed to the control device 18. In this regard, it is ideal if, during this step 25, at least one pressure value is measured per lifting column 6 of a pair of front transportation means or rear transportation means. With reference to the pressure reading thus obtained, a pressure setpoint value of at least the one actuator 10 of the lifting column 6 of at least one transportation means 5 is determined during the subsequent step 26 by means of the control device 18 for the machine frame 2 being in its normal position. Such a pressure setpoint value serves as a reference value for the control method described in greater detail below, by means of which the weight force loads on the lifting columns 6 take place due to deviations from the normal position of the machine frame 2 for the purpose of balancing the machine frame 2. Such a step 26 does not take place continuously but occurs, for example, by way of manual activation and/or when the construction machine 1, etc. begins to move.

During the entire driving and operating phase, provision is now made, according to step 27, for monitoring of the pressure value P of the ground milling machine 1 as applied to the relevant actuator 10. During this process, the registered actual pressure values $p_1/p_2$ applied to the actuator are continuously compared with the pressure setpoint value $p_0$ according to step 28 by means of the control device 18. In the event of deviations $\Delta p$ occurring between the actual pressure value $p_1/p_2$ and the pressure setpoint value $p_0$, the control device 18 controls a reverse adjustment of the lifting columns of the pair of front transportation means and/or the pair of rear transportation means in the direction of the pressure setpoint value $p_0$ by way of separate actuation of the actuators by the control device. Weight force changes and resulting pressure changes in the hydraulic system of the actuators 10 thus serve as a reference for stabilization of the machine frame 2 of the ground milling machine 1 in the direction of the normal position for the purpose of counteracting tilting of the ground milling machine 1 when driving over obstructions. Such reverse adjustment is carried out during step 29 and, ideally, continues until the actual pressure value $P_1/P_2$ has been adjusted to the pressure setpoint value $P_0$. This process is repeated continuously during the driving and working operation. As already mentioned with reference to FIG. 6, provision is advantageously made for the step 29 to take place only when a differential pressure threshold value $\Delta P$ is exceeded so as to prevent the regulation process from being triggered by minute changes in pressure. Provision is consequently made in such a development of the method according to one aspect of the present invention for the control device 18 also to monitor exceedance and understepping of such predefined pressure threshold values.

Monitoring of the pressure on the pair of rear or front transportation means preferably takes place not only with respect to one actuator, but also with respect to both actuators of the respective pair of front and/or rear transportation means. In this regard, it is advisable not to refer to a single pressure setpoint value, but to form a pressure setpoint value quotient as a reference value for the steps 26, etc., which is monitored by the control device 18 according to the steps 27, 28, and 29 and used as a reference value for the regulating process described above. The formation of the quotient is indicated in FIG. 8 by the reference numeral 30.

Apart from aspects concerning structure and design, the weight force distribution of the ground milling machine 1 against the actuators 10 is particularly important for the pressure values applied to the individual actuators 10. Significant changes may, however, occur in the operational mode, for example, due to the consumption of water and/or fuel and/or leveling operations of the ground milling machine 1. According to the steps 31 to 33, the method according to one embodiment of the present invention therefore ideally encompasses at least one or more corrective functions that deduct the changes in weight force distribution caused by such factors from the pressure setpoint values or the pressure setpoint value quotients. To this end, provision is made for the transmission of the water level reading to be carried out by means of a water level sensor as shown in step 31, for the transmission of the fuel level reading to be carried out by means of a fuel level sensor as shown in step 32, and for the transmission of the degree of tilt along the longitudinal axis of the ground milling machine to be carried out by means of a tilt sensor 33.

As particularly depicted in detail in FIG. 7a, the determination of the pressure values according to step 25 is preferably carried out simultaneously with the respective actuators of a pair of transportation means and particularly at points of like function. This means that the pressure registration is ideally carried out, for example, for both actuators on the piston-side or on the rod-side or simultaneously on both sides thereof.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A construction machine, comprising:
 a machine frame;
 a pair of front transportation devices and a pair of rear transportation devices, at least one of the pairs of front and rear transportation devices being connected to said machine frame via lifting columns each of which comprises an actuator;
 a driving device for independent propulsion of the actuators of the lifting columns; and
 a control device configured to control a lift adjustment of the lifting columns via the actuators,
 wherein
 a pressure measuring device is allocated to at least one actuator (10) of a pair of front or rear transportation devices and is configured for registration of the pressure value (p) applied to said at least one actuator, and
 said control device controls a set position of the actuators of said pair of transportation devices according to the pressure values (p) obtained by the pressure measuring device (19),
 and further wherein the control device is configured in such a manner that, starting from a normal position of the machine frame, in which a setpoint pressure value ($p_0$) prevails, the control device controls the two actuators of said pair of front and/or rear transportation devices independently of each other when pressure changes occur during the driving operation and approaches the actual pressure value in the direction of the setpoint pressure value via a reverse lift adjustment of the actuators.

2. The construction machine according to claim 1, wherein each of said transportation devices is separately connected to said machine frame by means of the lifting column having an actuator, and that said control device controls each of said actuators separately.

3. The construction machine according to claim 1, wherein said actuators are hydraulic cylinders, that a hydraulic supply system comprising a hydraulic pump is present, that for each lifting column valves are provided which are configured for hydraulic fluid inlet and outlet and are controlled independently of each other by the control device, and that a respective pressure measuring device for registration of the hydraulic pressure (p) applied to the hydraulic cylinder is allocated to each hydraulic cylinder.

4. The construction machine according to claim 3, wherein the hydraulic cylinders are working cylinders acting in both directions, and that the pressure measuring device is designed in such a manner that the pressure measuring device measures the pressure values on a piston side and/or on a rod side.

5. The construction machine according to claim 1, wherein the control device is designed in such a way that, with the machine frame being in the normal position in relation to a pair of transportation devices, said control device calculates a setpoint pressure value ($p_0$) for each actuator and a setpoint pressure value quotient and controls the two actuators independently of each other in the case of pressure changes ($\Delta p$) occurring during operation, and triggers the actuators from an actual pressure value quotient in a direction of a setpoint pressure value quotient via a converse lift adjustment of the actuators.

6. The construction machine according to claim 1, wherein at least one sensor is provided, which conveys sensor information to the control device, and that the control device is configured in such a manner that the sensor information is taken into consideration for the control of the actuators, the at least one sensor comprising at least one of:
 a filling level sensor for a fuel tank;
 a filling level sensor for a water tank; and/or
 a tilt sensor for measuring a degree of tilt of the machine frame along the longitudinal axis or the transverse axis of the construction machine.

7. The construction machine according to claim 1, wherein the construction machine comprises a device for determination of a vertical level of the construction machine in the normal position.

8. The construction machine according to claim 1, wherein the construction machine comprises an automatic milling starter controlled by the control device.

9. A method for compensating for ground unevenness for a construction machine according to claim 1, comprising the steps of:
 a) registering the pressure value applied to at least one actuator of at least one lifting column of at least one transportation device by means of a pressure measuring device and conveying the pressure value to a control device;
 b) setting a setpoint pressure value for at least one actuator of a lifting column of at least one transportation device when the machine frame is in the normal position;
 c) monitoring the pressure value applied to the actuator while the construction machine is in motion;
 d) comparing an actual pressure value with the setpoint pressure value by means of the control device; and
 e) upon deviation between the actual pressure value and the setpoint pressure value, conversely adjusting the lifting columns of the front transportation devices in the direction of the setpoint pressure value by way of separate activation of the actuators via the control device.

10. The method according to claim 9,
wherein in step b) a setpoint pressure value quotient is determined from two setpoint pressure values of two actuators of a pair of transportation devices; and
in steps d) and e) comparison and adjustment are carried out with respect to the setpoint pressure value quotient.

11. The method according to claim 10,
wherein the control device carries out a correction in such a way that it results in synchronization of the setpoint pressure value or the setpoint pressure value quotient with at least one signal of at least one sensor, the at least one sensor comprising at least one of a water level sensor, a fuel level sensor, and/or a tilt sensor.

12. The method according to claim 9,
wherein a determination of the pressure values applied to the actuators of a pair of transportation devices takes place simultaneously and at points of like function.

13. A construction machine according to claim 1,
wherein said construction machine comprises a road milling machine.

14. A method according to claim 9,
wherein said construction machine comprises a ground milling machine.

* * * * *